(12) United States Patent  
Srebranig (10) Patent No.: US 8,666,911 B2  
(45) Date of Patent: Mar. 4, 2014

(54) SYSTEM AND METHOD FOR STATISTICAL MEASURMENT VALIDATION

(75) Inventor: Steven Srebranig, Johnsburg, IL (US)

(73) Assignee: STMicroelectronics, Inc., Coppell, TX (US)

(*) Notice: Subject to any disclaimer, the term of this patent is extended or adjusted under 35 U.S.C. 154(b) by 729 days.

(21) Appl. No.: 12/592,708

(22) Filed: Nov. 30, 2009

(65) Prior Publication Data

US 2010/0169247 A1    Jul. 1, 2010

Related U.S. Application Data

(60) Provisional application No. 61/203,973, filed on Dec. 31, 2008.

(51) Int. Cl.  
*G06F 15/18* (2006.01)

(52) U.S. Cl.  
USPC .......................................................... 706/12

(58) Field of Classification Search  
USPC .......................................................... 706/12  
See application file for complete search history.

(56) References Cited

U.S. PATENT DOCUMENTS

2001/0007948 A1* 7/2001 Stoop et al. ..................... 607/14

OTHER PUBLICATIONS

FinanceIsland, "Tutorial: Basic Statistics" Finance Island Incoprorated May 2008 [Online] Downloaded.*

Wand, M.P. "Data-based Choice of Histogram Bin Width" Australian Graduate School of Management University of New South Wales. May 1996. [Online] Downloaded Jul. 9, 2012 http://www.jstor.org/discover/10.2307/2684697?uid=40537&uid=3739936&uid=2&uid=3&uid=67&uid=40535&uid=62&uid=37392 56&sid=47699123703687.*

* cited by examiner

*Primary Examiner* — Ben Rifkin  
(74) *Attorney, Agent, or Firm* — Munck Wilson Mandala, LLP (57) ABSTRACT

An apparatus and method are disclosed for a measurement system that reports as a measurement result a confidence interval associated with a histogram bin into which a measurement value falls. The confidence interval is calculated from a subset of training values that also fall within the histogram bin. A training process may be performed in which a plurality of training values is obtained and a mean and standard deviation of the values determined. A plurality of histogram bins are defined from the mean and standard deviation and, for the subsets of training values that fall into each bin, confidence intervals calculated. A need to perform the training process may be determined from a plurality of measured values.

20 Claims, 5 Drawing Sheets

TABLE 1: BER SIMULATED DATA (SIGNAL AND NOISE)

| | MEAN | SIGMA | SAMPLE COUNT | CI MIN (3-SIGMA) | CI MAX (3-SIGMA) | BIN COUNT | % |
|---|---|---|---|---|---|---|---|
| LOWER TAIL BIN | 1.9193E-11 | 3.62657E-13 | 7 | 1.8105E-11 | 2.0281E-11 | 12 | 0.12 |
| LOWER CONTROL BIN | 2.04344E-11 | 2.18706E-13 | 10 | 1.97783E-11 | 2.10905E-11 | 208 | 2.08 |
| LOWER MID BIN | 2.18293E-11 | 4.34153E-13 | 10 | 2.05268E-11 | 2.31318E-11 | 2861 | 28.61 |
| NULL BIN | 2.29954E-11 | 3.20122E-13 | 10 | 2.20351E-11 | 2.39558E-11 | 3839 | 38.39 |
| UPPER MID BIN | 2.41741E-11 | 1.18156E-15 | 10 | 2.41706E-11 | 2.41777E-11 | 2851 | 28.51 |
| UPPER CONTROL BIN | 2.55341E-11 | 2.43657E-13 | 10 | 2.48032E-11 | 2.62651E-11 | 218 | 2.18 |
| UPPER TAIL BIN | 2.66751E-11 | 1.10553E-13 | 6 | 2.63435E-11 | 2.70068E-11 | 12 | 0.12 |

*FIG. 7*

SYSTEM AND METHOD FOR STATISTICAL MEASURMENT VALIDATION

CROSS-REFERENCE TO RELATED APPLICATION AND CLAIM OF PRIORITY

The present application is related to U.S. Provisional Patent Application No. 61/203,973, filed Dec. 31, 2008, entitled "SYSTEM AND METHOD FOR STATISTICAL MEASUREMENT VALIDATION". U.S. Provisional Patent Application No. 61/203,973 is assigned to the assignee of the present application and is hereby incorporated by reference into the present disclosure as if fully set forth herein. The present application hereby claims priority under 35 U.S.C. §119(e) to U.S. Provisional Patent Application No. 61/203, 973.

TECHNICAL FIELD

The present disclosure relates generally to measurement systems, and in particular to a system and method for statistical measurement validation.

BACKGROUND

A typical statistical validation of a measurement entails determining whether or not to reject a hypothesis that a measurement value is a member of a targeted population. Hypothesis testing is a useful technique that allows a measurement system designer to control a measurement process and the root causes that the measurements are intended to predict. However, a system designer may want to go beyond knowing simply that a particular measurement is within a single range of acceptable values. The system designer may want to know what an actual measurement value is, to a reasonable tolerance, knowing it is buried within a relatively wide acceptance range due to normal noise and variation.

A measurement typically contains natural variations that may obfuscate the information a measurement system is attempting to obtain from the measurement. The information is the signal and what is not information, but is added into the measurement with the signal, is noise. As such, a measurement system is required to estimate a signal in the presence of noise.

SUMMARY

Embodiments of the present disclosure generally provide a system and method for statistical measurement validation.

In one embodiment, the present disclosure provides a method that includes obtaining a measurement value and determining a histogram bin into which the measured value falls. The method also includes reporting a measurement result. The measurement result is a confidence interval that is associated with the histogram bin. The confidence interval is calculated from a subset of training values that fall within the histogram bin.

In another embodiment, the present disclosure provides an apparatus that includes an input interface, a communication interface, a memory, and a controller. The controller is adapted to obtain a measured value via the input interface and determine a histogram bin into which the measured value falls. The controller is also adapted to report a measurement result via the communication interface. The measurement result is a confidence interval that is stored in the memory. The confidence interval is associated with the histogram bin and is calculated from a subset of training values that fall within the histogram bin.

In yet another embodiment, the present disclosure provides a system that includes a sub-system with an operational characteristic and a measurement system that is adapted to measure the operational characteristic. The measurement system includes an input interface coupled to the sub-system, a communication interface, a memory and a controller. The controller is adapted to obtain a measured value of the operational characteristic via the input interface and determine a histogram bin into which the measured value falls. The controller is also adapted to report a measurement result via the communication interface. The measurement result is a confidence interval that is stored in the memory. The confidence interval is associated with the histogram bin and is calculated from a subset of training values that fall within the histogram bin.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure presents a method and system that realize a measurement per se as its own entity. The problem associated with knowing what a measurement value is is presented, a method is proposed toward resolving this difficulty, and an empirical analysis is shown that provides an example of the method according to the present disclosure.

Measurement systems typically use confidence intervals because measurements inseparably combine both signals and noise, and a typical measurement system typically looks at a measurement sample as a whole, to predict the actual population and whether or not the sample represents what is expected—this may be referred to as a macroscopic analysis. Embodiments of the present disclosure use a microscopic analysis, by looking at measurements individually (or in groups) and deducing a valid, narrow range of the value from it. In the macroscopic realm, a measurement system examines a histogram of measurement data that poses as a population distribution, while embodiments of the present disclosure, at the microscopic level, examine the individual bins of a histogram, each as a viable Gaussian distribution in its own right.

Measurement systems typically make a histogram of a measured population and contrast it with a continuous theoretical normal distribution. Whether or not the system actually overlays a Gaussian curve on the histogram, the system does it analytically when calculating the confidence of the data match to the target theoretical curve.

Figure 1:
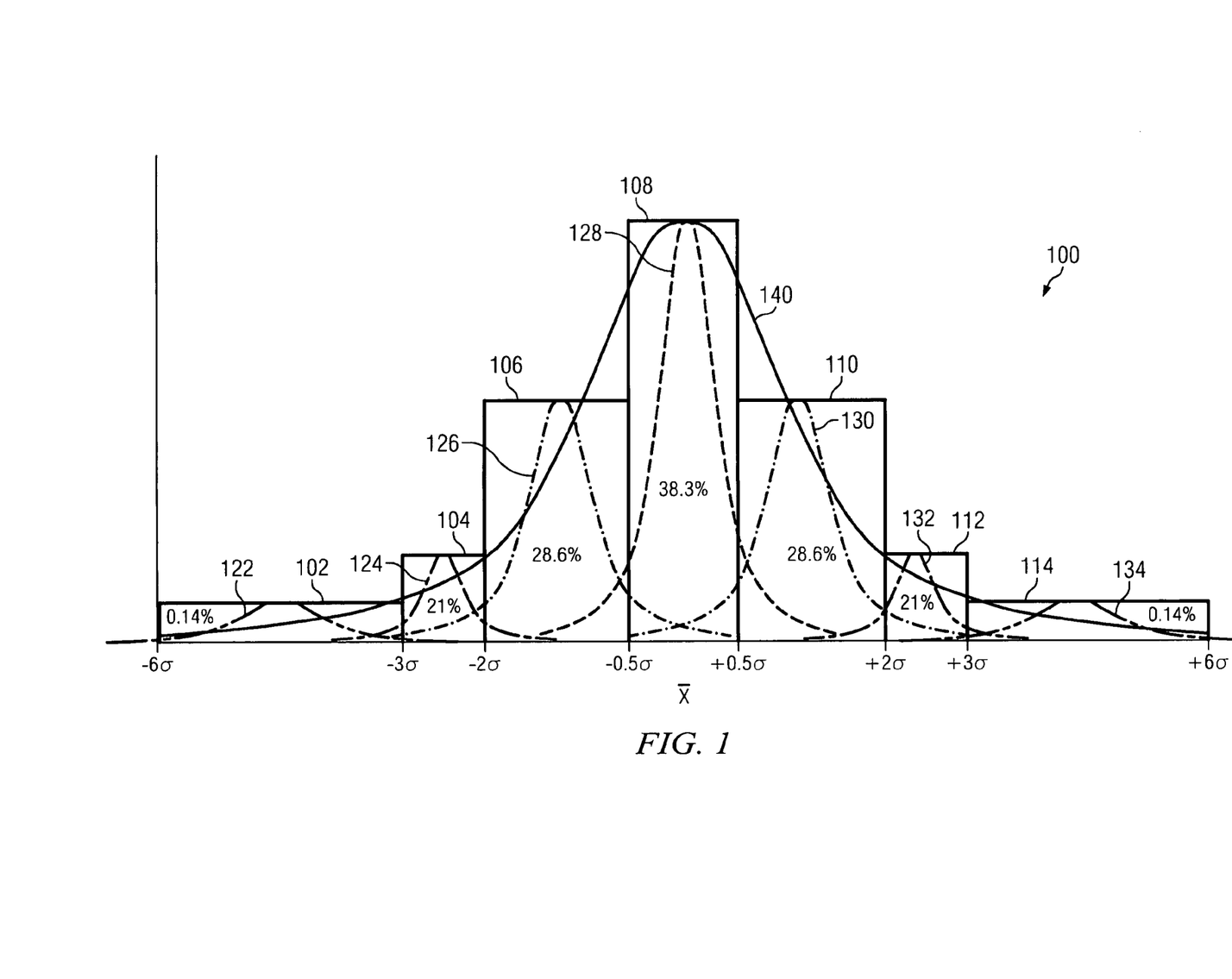
FIG. 1 shows an exemplary partitioning of a measurement population into micro-analytical bins used by embodiments of the present disclosure.

Embodiments of the present disclosure go further than qualifying the overall measurement session using such a macro-analytical method, by using a micro-analytical technique that provides a validation of individual measurements within the target distribution. FIG. 1 shows an example partitioning 100 of a measurement population into micro-analytical bins used by embodiments of the present disclosure in such an analysis: a Lower Tail Bin 102, a Lower Control Bin 104, a Lower Middle (Mid) Bin 106, a Null Bin 108, an Upper Middle (Mid) Bin 110, an Upper Control Bin 112, and an Upper Tail Bin 114. Each bin is described by its own Gaussian distribution (curves 122, 124, 126, 128, 130, 132, and 134, respectively). A curve 140 represents an overall population match to a theoretical Gaussian distribution. A Gaussian (or normal) distribution is described by a mean (represented by p) and a standard deviation (represented by a).

The Null Bin 108 may be applied directly to the theoretical Gaussian curve 140, since the Null Bin 108 is centered on the Gaussian distribution and normally distributed; however, the bins 102-106 and 110-114 each resides on some portion of the tails of the Gaussian curve 140. In bins 102-106 and 110-114, the number of members is larger at one end of the curve section than at the other end of the section. Embodiments of the present disclosure use the Mean Value Theorem (MVT), by creating a sampled population from the bin data. Because of this, the analysis may be more accurate on the Null Bin 108 than the bins 102-106 and 110-114—however, reasonable identification of what a measurement value is within tail bins may still be obtained. For algorithmic simplicity, the MVT may be applied to the Null Bin 108 as well, without sacrificing analytical accuracy.

The bins in FIG. 1 are set up so that 38.3% of the measurements will reside within the Null Bin 108 (defined as ±½σ), 28.6% within each of the Mid Bins 106 and 110 (defined as ½σ to 2σ), 2.1% within each of the Control Bins 104 and 112 (defined as 2σ to 3σ), and 0.14% in each of the Tail bins 102 and 114 (defined as 3σ to 6σ). Such a partitioning gives seven value ranges. The bin demarcations are defined by the σ derived from the entire data set (the whole population), that is, the standard deviation of the curve 140.

Figure 2:
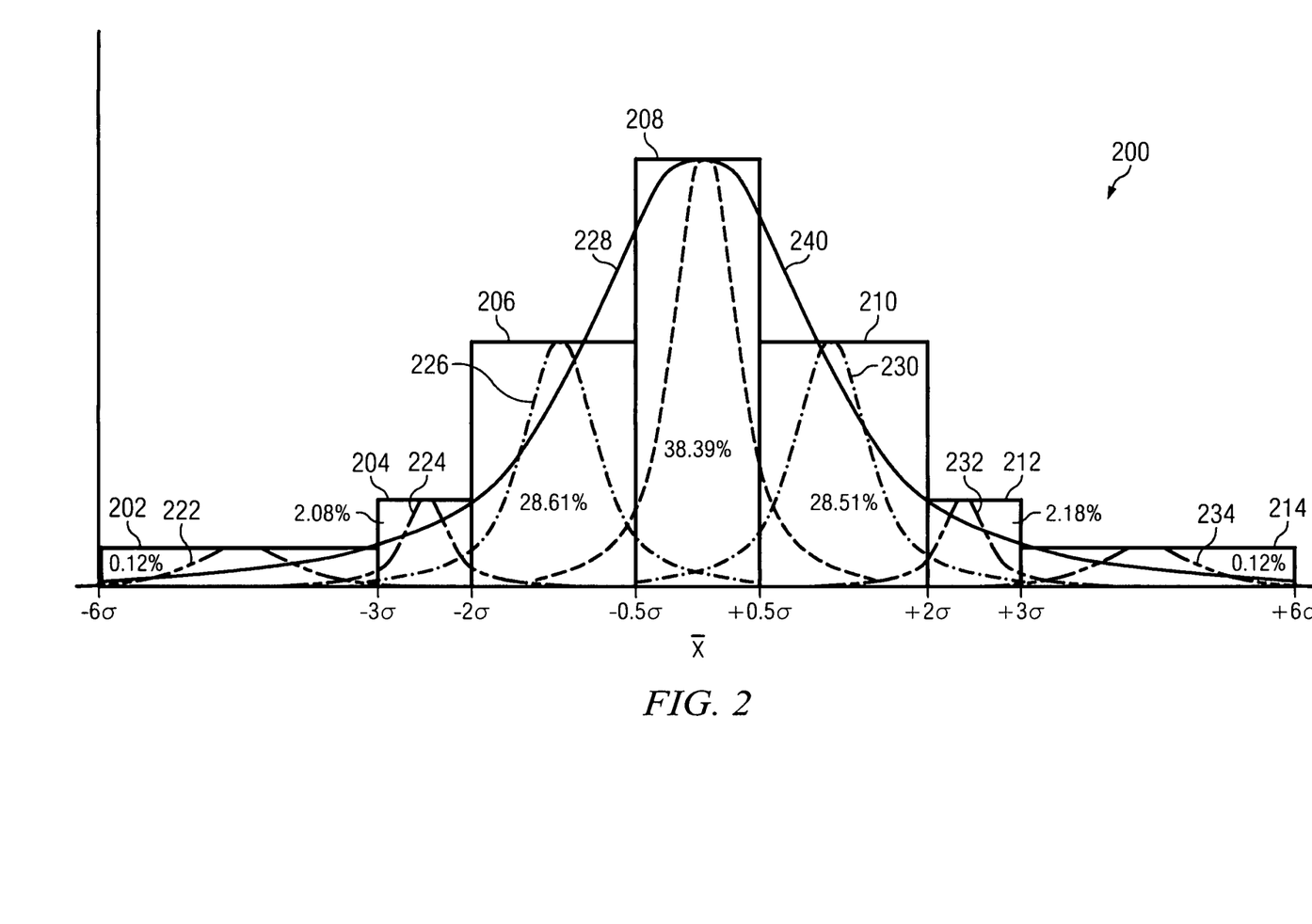
FIG. 2 shows a partitioning of a simulated measurement population into micro-analytical bins in a demonstration of the method of the present disclosure.
Figure 7:
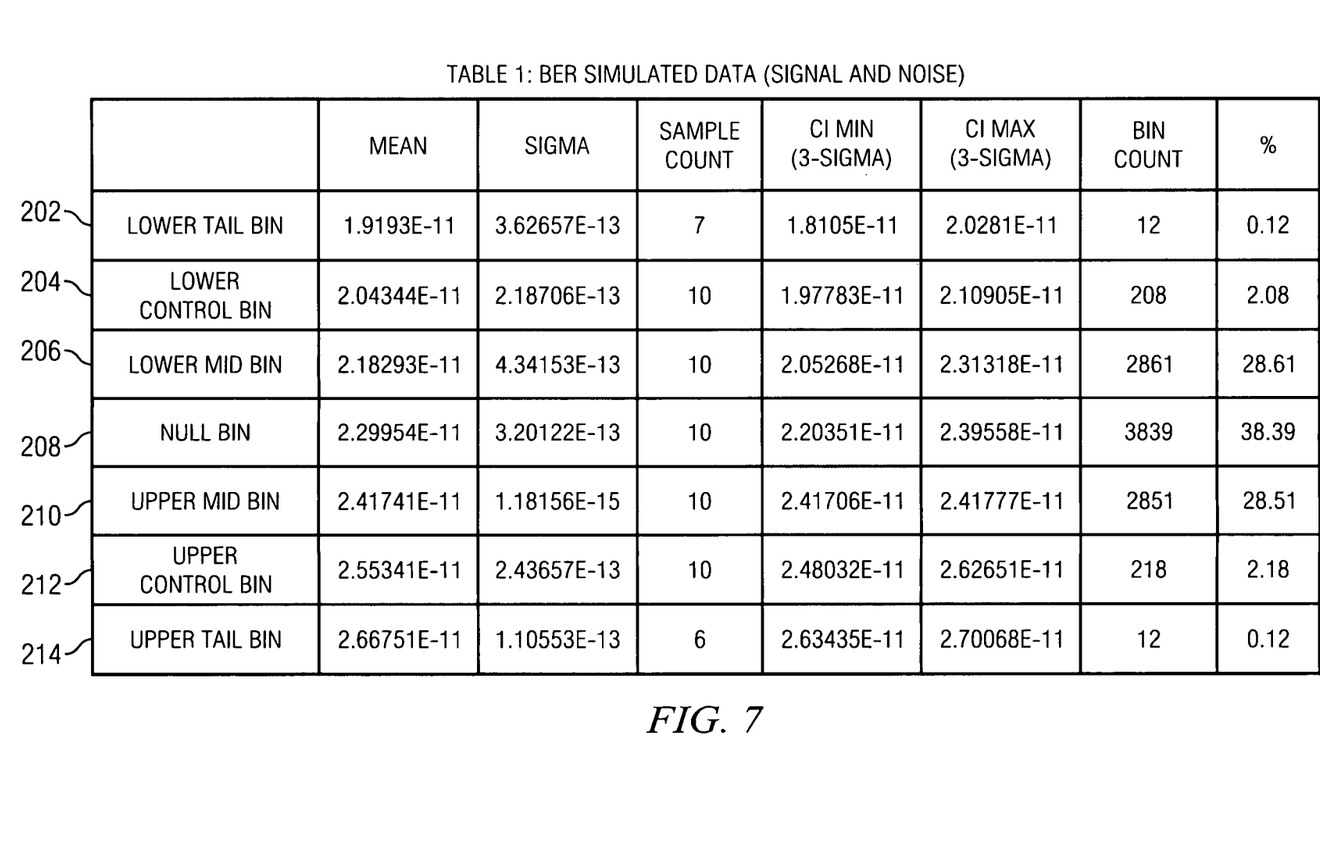
FIG. 7 present in tabular form data relating to a partitioning according to the present disclosure of the simulated measurement population of FIG. 2.

An example of simulated Bit Error Ratio (BER) measurements may be generated. The data may be 10,001 simulated measurements with a normally distributed BER (the signal) of 2e-11 with a standard deviation of 1e-12. Added to this signal may be a normally distributed noise (simulating Additive White Gaussian Noise, AWGN) of 3e-12 with a standard deviation of 5e-13. FIG. 2 shows a partitioning 200 of such a simulated measurement population into micro-analytical bins in a demonstration of the method of the present disclosure For each bin in FIG. 2, Table 1 (in FIG. 7) shows a mean and standard deviation and a sample count (the number of data points used to calculate each sample average and standard deviation, the grand averages of which constitute the mean and sigma of the table) as generated according to the present disclosure from the data set of simulated measurements. Each row presents data for one of the bins 202 through 214. Data in the mean and sigma columns describe a Gaussian distribution 222 through 234 for each of the bins 202 through 214, respectively. As may be seen in the histogram of FIG. 2, the fill rate (percentage per bin) matches the expectations from FIG. 1.

Once demarcations have been constructed for each of the bins 202 through 214, and a standard deviation of each bin has been determined, a confidence level of the actual measurements may be determined. Embodiments of the present disclosure use as a measurement value the confidence interval defined for the bin that a measurement datum falls within. Table 2 shows nine measurement points from the simulated BER with noise. Examining the data reveals that these measurements fall within the 99.73% (3σ) CI min-max ranges shown (that is, the ranges are used as the measurement).

TABLE 2

Datum Confidence Intervals for Simulated Measurements

| Original Measure | Bin | CI Min | CI Max |
|---|---|---|---|
| 2.00145E-11 | Lower Control | 1.97783E-11 | 2.10905E-11 |
| 2.25004E-11 | Null | 2.20351E-11 | 2.39558E-11 |
| 2.67379E-11 | Upper Tail | 2.63435E-11 | 2.70068E-11 |
| 2.33756E-11 | Upper Mid | 2.41706E-11 | 2.41777E-11 |
| 1.91619E-11 | Lower Tail | 1.8105E-11 | 2.0281E-11 |
| 2.3647E-11 | Upper Mid | 2.41706E-11 | 2.41777E-11 |
| 2.03113E-11 | Lower Control | 1.97783E-11 | 2.10905E-11 |
| 2.62507E-11 | Upper Control | 2.48032E-11 | 2.62651E-11 |
| 2.13671E-11 | Lower Mid | 2.05268E-11 | 2.31318E-11 |

In other embodiments, the micro-analytic method of the present disclosure may use more than seven bins. In such embodiments, the confidence interval for each measurement may be narrowed even further.

The method of micro-analysis of the present disclosure may be used in a measurement system or measurement equipment. Such system or equipment initially runs a calibration mode (or training process) that sets up bin demarcations and reports the measurements as a valid confidence interval of user specified probability. The system may be a device that provides a function of reporting a reliable value of a key parameter (for example, BER of a digital information device) using a process illustrated in FIG. 3.

Figure 3:
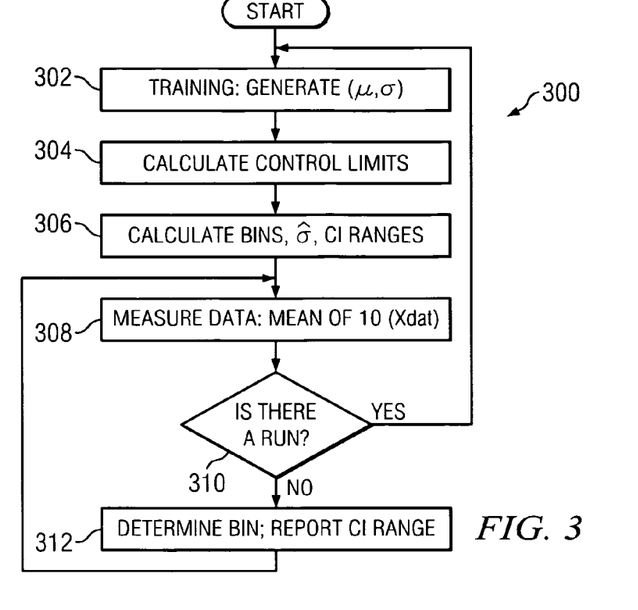
FIG. 3 presents a flowchart of a method according to the present disclosure.

A process 300 according to the present disclosure performs a training sequence in step 302 to gather initial data (for example, 100 data points) and calculate a mean (μ) and standard deviation (σ) for the initial data. From this information, in step 304 3σ control limits are calculated for the initial data. In step 306, the process 300 calculates bins and confidence intervals for the bins, as described with reference to FIG. 1 and FIG. 2. At this point, a measurement process may begin.

Ten data points may be measured in step 308, and an average value calculated. In step 312, the process 300 determines a correct bin for the average value and reports the confidence range for the bin. In some embodiments, the correct bin is determined by selecting the bin whose mean value is closest to the average value. In other embodiments, the correct bin is selected using the bin boundaries as defined from the standard deviation (σ) for the initial data. The process 300 may also check for a run in step 310 (indicating a population shift) and, if a run is detected, return to step 302 to re-train. If no run is detected in step 310, the process 300 returns to step 308 and a next set of ten measurements is made.

In other embodiments a single data point may be measured in step 308, rather than ten data points. In still other embodiments, a number of measurements other than ten may be measured and an average value calculated.

A run may be detected in step 310 by comparing a current average value to previous average values. In some embodiments, a run may be defined as three successive average values to the same 'side' of the Null Bin 108—that is, three successive average values in any of the bins 202-206 or in any of the bins 210-214. In other embodiments, a run may be defined as successive averages in the bin sequence 206/204/202 or in the bin sequence 210/212/214. In some embodiments, a number of successive average values other than three may be used. Any suitable definition of a run may be employed that indicates that the measurements may have drifted from the overall Gaussian distribution for the population calculated during the step 302.

The micro-analytic method of the present disclosure may additionally or alternatively use Statistical Process Control (SPC) on each bin for critical parameter modeling that would yield quicker results of out of control performance and hence a speedier mechanism of correction.

In other embodiments, in step 310, the process 300 may monitor a value of such a critical parameter identified by SPC to trigger a return to step 302 to re-train.

After the training sequence (steps 302-306), which is the calibration process for the measurement system, further measurement data is reported (in step 312) as a statistical average value with a specified level of confidence determined for the bin within which the average measurement falls.

The present disclosure is a novel extension of proven statistical techniques. The present disclosure applies methods of a macro-analytical plan to serve in a micro-analytical realm and generates increasingly narrow accuracy with statistical assurance. By looking at a measurement population as a histogram of bins with their own viable populations, the present disclosures use the described method to identify reliable ranges for individual measurements.

Figure 4:
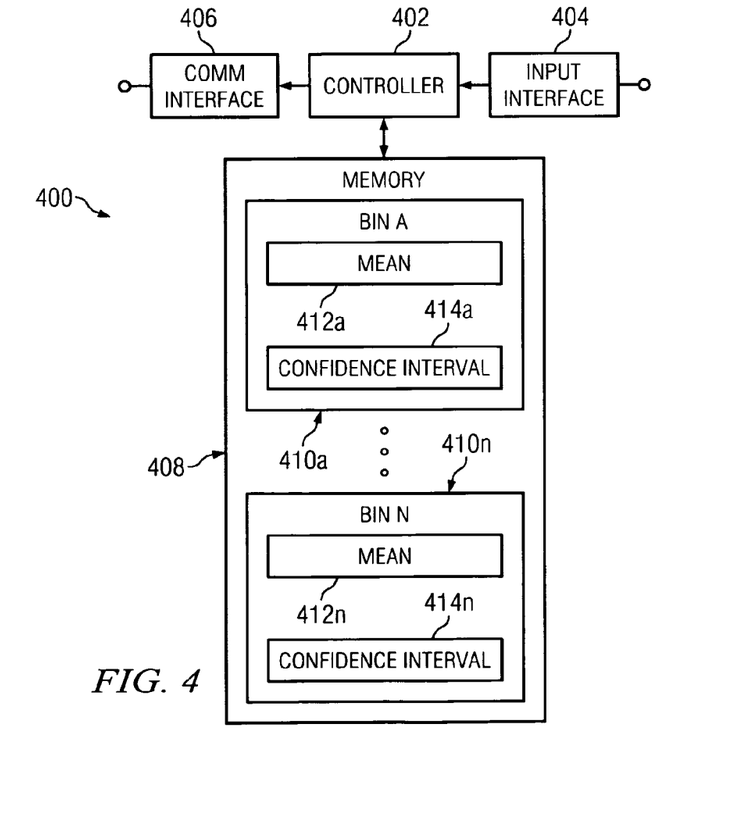
FIG. 4 presents a block diagram of a measurement system according to the present disclosure.

A measurement system 400 according to the present disclosure is presented in FIG. 4. A controller 402 is operable to obtain measured values via an input interface 404. The controller is further operable to report measurement results via a communication interface 406. The controller is communicatively coupled to a memory 408.

Within the memory 408 are stored information blocks 410a through 410n, associated with histogram bins A through N, respectively. For each histogram bin, the associated information block stores a mean value 412 and a confidence interval 414. Reference characters 412a and 414a, respectively, are used in FIG. 4 to indicate the mean and confidence interval associated with the histogram bin A. Similarly, reference characters 412n and 414n, respectively, are used in FIG. 4 to indicate the mean and confidence interval associated with the histogram bin N.

The controller 402 is further operable to perform the steps of the method of FIG. 3. The controller 402 obtains a plurality of training values via the input interface 404 and calculates a population mean and a population standard deviation from the plurality of training values. The controller 402 defines the histogram bins A through N from the population mean and the population standard deviation, and determines corresponding subsets of the training values whose members fall within the histogram bins A through N. From the subset of training values associated with each of the histogram bins A through N, the controller 402 calculates a subset mean 412 and a subset standard deviation, and, from the subset mean and the subset standard deviation, a confidence interval 414. The controller 402 stores the mean 412 and confidence interval 414 associated with each histogram bin A through N in the associated information blocks 410a through 410n.

The controller 402 is further operable to obtain a measurement value via the input interface 404 and determine which of the histogram bins A through N the measurement value falls into. The controller 402 reports as a measurement result the confidence interval 414 associated with the histogram bin via the communication interface 406.

The controller 402 is still further operable to detect runs, as described with reference to step 310 of FIG. 3. That is, the controller 402 is operable to determine from a plurality of measured values whether the population mean and population standard deviation still accurately reflect the measured values being received via the input interface 404. If not, the controller 402 responds by again performing the training sequence of steps 302 through 306 of FIG. 3.

Some embodiments of the method of the present disclosure are systems that measure bit error rate (BER) or Carrier to Noise Ratio (CNR) and report this data within the mechanism of a decoding device, such as systems that reside within a Direct Broadcast Satellite (DBS) demodulator device and are used for pointing receiver antennas or providing a quantitative measure of quality of service.

Figure 5:
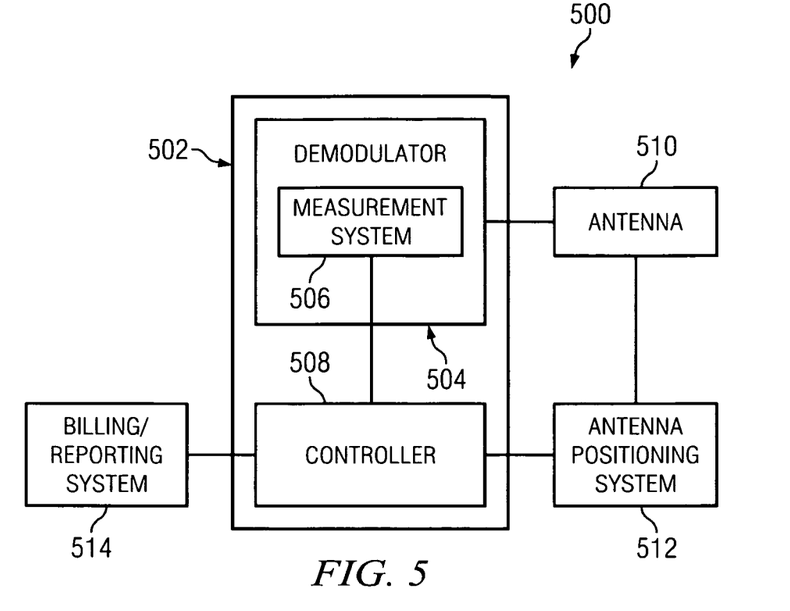
FIG. 5 presents a block diagram of a direct broadcast satellite receiver according to the present disclosure.

One example of such an embodiment is shown in FIG. 5. System 500 includes a DBS receiver 502. The DBS receiver includes a demodulator 504 and a controller 508. The demodulator 504 is coupled to an antenna 510 to receive communication signals. The demodulator 504 includes a measurement system 506 that is operable to apply the method of the present disclosure to measure operational characteristics of the communication signals received from the antenna 510. Examples of such operational characteristics include BER and CNR. The measurement system 506 communicates measurement results to the controller 508 as confidence intervals. Based upon the reported measurement results, the controller may signal an antenna positioning system 512 to change a position of the antenna 510. Also based upon the measurement results, the controller 508 may report a quality of service measure to a billing/reporting system 514 for the purpose of charging a user of communication services provided by the system 500 or for reporting operational characteristics of the system 500 for maintenance purposes.

Figure 6:
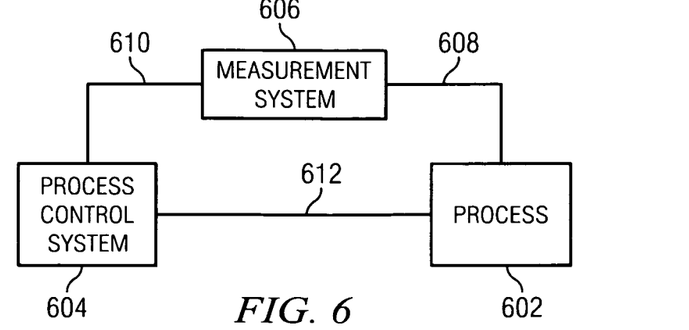
FIG. 6 presents a block diagram of a process control system according to the present disclosure.

FIG. 6 shows a process control system 600 according to the present disclosure. A process 602 may be performed in a processing facility such as a manufacturing plant, a chemical plant, crude oil refinery, an ore processing plant, or other such facility. A measurement system 606 according to the present disclosure may measure the current values of one or more process variable 608 or other characteristic of the process 602. Examples of such process variables 608 include rotational velocity and acceleration, fluid flow, and temperature.

The measurement system 606 communicates measurement results via a communication link 610 to a process control system 604. According to the method of the present disclosure, the measurement system 606 reports a measurement result to the process control system 604 as a confidence interval of a bin in which the value of the measured characteristic falls. The process control system 604 communicates one or more control variable or other parameter to the process 602 via a communication link 612 to control the process 602.

As shown with reference to FIGS. 5 and 6, a system according to the present disclosure may include a subsystem such as a DBS antenna/demodulator or a process, where the subsystem has one or more operational characteristics. A measurement system according to the present disclosure measures one or more of the operational characteristics and reports the measurement results to a controller as a confidence interval. In some embodiments, the controller controls the subsystem based upon the measurement results. In other embodiments, the controller reports the measurement results to an external system.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    obtaining a measured value at an input interface to a measurement system including at least a controller and a memory coupled to the controller;
    determining a histogram bin among a plurality of histogram bins stored within the memory for a range of values into which the measured value falls, wherein each range of values for a histogram bin is selected to obtain a corresponding one of a plurality of predetermined percentages of training values within the respective bin, the predetermined percentages defined based on a standard deviation ($\sigma$) of a set of training values, the plurality of histogram bins comprising:
        a null bin corresponding to $\pm\frac{1}{2}\sigma$,
        first and second mid bins corresponding to $+\frac{1}{2}\sigma$ to $+2\sigma$ and $-\frac{1}{2}\sigma$ to $-2\sigma$, respectively,
        first and second control bins corresponding to $+2\sigma$ to $+3\sigma$ and $-2\sigma$ to $-3\sigma$, respectively, and
        first and second tail bins corresponding to $+3\sigma$ to $+6\sigma$ and $-3\sigma$ to $-6\sigma$, respectively; and
    reporting, from the controller as a measurement result, a confidence interval associated with the histogram bin for the range of values into which the measured value falls, wherein the associated confidence interval is calculated based upon a distribution of a subset of the training values, the subset of the training values all falling within the range of values for the histogram bin.

2. The method of claim 1, wherein obtaining a measured value further comprises:
    obtaining a plurality of measurement values; and
    generating the measured value from the plurality of measurement values.

3. The method of claim 1, wherein determining a histogram bin for a range of values into which the measured value falls further comprises:
    determining a histogram bin having an associated mean value for measurement values within that histogram bin that is closest to the measured value, wherein the mean value associated with each histogram bin is calculated from the subset of training values all falling within the range of values for the histogram bin.

4. The method of claim 1, further comprising performing a training process, wherein the training process comprises:
    obtaining the set of training values;
    determining a population mean and the population standard deviation from the set of training values; and
    defining the plurality of histogram bins from the population mean and the population standard deviation ($\sigma$).

5. The method of claim 4, wherein calculating the confidence interval associated with the histogram bin further comprises:
    calculating a subset mean and a subset standard deviation from the subset of the plurality of training values corresponding to the histogram bin; and
    calculating the confidence interval associated with the histogram bin from the subset mean and the subset standard deviation.

6. The method of claim 4, further comprising:
    determining from a plurality of measured values a need to perform the training process; and
    in response to the determination of the need, performing the training process.

7. The method of claim 6, wherein determining from a plurality of measured values a need to perform the training process further comprises:
    determining that all of the plurality of measured values are greater than the population mean or less than the population mean.

8. An apparatus, comprising:
    an input interface;
    a communication interface;
    a memory; and
    a controller configured to:
        obtain a measured value via the input interface;
        determine a histogram bin among a plurality of histogram bins for a range of values into which the measured value falls, wherein each range of values for a histogram bin is selected to obtain a corresponding one of a plurality of predetermined percentages of training values within the respective bin, the predetermined percentages defined based on a standard deviation ($\sigma$) of a set of training values, the plurality of histogram bins comprising:
            a null bin corresponding to $\pm\frac{1}{2}\sigma$,
            first and second mid bins corresponding to $+\frac{1}{2}\sigma$ to $+2\sigma$ and $-\frac{1}{2}\sigma$ to $-2\sigma$, respectively,
            first and second control bins corresponding to $+2\sigma$ to $+3\sigma$ and $-2\sigma$ to $-3\sigma$, respectively, and
            first and second tail bins corresponding to $+3\sigma$ to $+6\sigma$ and $-3\sigma$ to $-6\sigma$, respectively; and
        report via the communication interface as a measurement result a confidence interval stored in the memory, the confidence interval associated with the histogram bin for the range of values into which the measured value falls, wherein the associated confidence interval is calculated based upon a distribution of a subset of the training values, the subset of the training values all falling within the range of values for the histogram bin.

9. The apparatus of claim 8, wherein the controller is further configured to:
    obtain a plurality of measurement values via the input interface; and
    generate the measured value from the plurality of measurement values.

10. The apparatus of claim 8, wherein the controller is further configured to determine the histogram bin for a range of values into which the measured value falls by determining a histogram bin having an associated mean value for measurement values within that histogram bin that is closest to the measured value, wherein the mean value associated with each histogram bin is calculated from the subset of training values all falling within the range of values for the histogram bin.

11. The apparatus of claim 8, wherein the controller is further configured to perform a training process by:
obtaining the set of training values;
determining a population mean and the population standard deviation from the set of training values; and
defining the plurality of histogram bins from the population mean and the population standard deviation ($\sigma$).

12. The apparatus of claim 11, wherein the controller is further configured to calculate the confidence interval associated with the histogram bin by:
calculating a subset mean and a subset standard deviation from the subset of the plurality of training values corresponding to the histogram bin; and
calculating the confidence interval associated with the histogram bin from the subset mean and the subset standard deviation.

13. The apparatus of claim 11, wherein the controller is further configured to:
determine from a plurality of measured values a need to perform the training process; and
in response to the determination of the need, perform the training process.

14. The apparatus of claim 13, wherein the controller is further configured to determine from the plurality of measured values the need to perform the training process by determining that all of the plurality of measured values are greater than the population mean or less than the population mean.

15. A system, comprising:
a sub-system having an operational characteristic; and
a measurement system adapted to measure the operational characteristic, the measurement system comprising:
an input interface coupled to the sub-system;
a communication interface;
a memory; and
a measurement controller configured to:
obtain a measured value of the operational characteristic via the input interface;
determine one of a plurality of histogram bins into which the measured value falls, each of the histogram bins corresponding to a different range of values, wherein each range of values for a histogram bin is selected to obtain a corresponding one of a plurality of predetermined percentages of training values within the respective bin, the predetermined percentages defined based on a standard deviation ($\sigma$) of a set of training values, the plurality of histogram bins comprising:
a null bin corresponding to $\pm\frac{1}{2}\sigma$,
first and second mid bins corresponding to $+\frac{1}{2}\sigma$ to $+2\sigma$ and $-\frac{1}{2}\sigma$ to $-2\sigma$, respectively,
first and second control bins corresponding to $+2\sigma$ to $+3\sigma$ and $-2\sigma$ to $-3\sigma$, respectively, and
first and second tail bins corresponding to $+3\sigma$ to $+6\sigma$ and $-3\sigma$ to $-6\sigma$, respectively; and
report via the communication interface as a measurement result a confidence interval stored in the memory, the confidence interval associated with the histogram bin, wherein the associated confidence interval is calculated from a subset of the training values, the subset of the training values falling within the histogram bin.

16. The system of claim 15, further comprising:
a system controller coupled to the communication interface and configured to:
receive a measurement result from the measurement controller; and
one of control the subsystem based upon the measurement result and report the measurement result to an external system.

17. The system of claim 15, wherein the measurement controller is further configured to determine the histogram bin into which the measured value falls by determining a histogram bin having an associated mean value closest to the measured value, wherein the mean value associated with each histogram bin is calculated from the subset of training values falling within the histogram bin.

18. The system of claim 15, wherein the measurement controller is further configured to perform a training process by:
obtaining the set of training values;
determining a population mean and the population standard deviation from the set of training values; and
defining the plurality of histogram bins from the population mean and the population standard deviation ($\sigma$).

19. The system of claim 18, wherein the measurement controller is further configured to calculate the confidence interval associated with the histogram bin by:
calculating a subset mean and a subset standard deviation from the subset of the plurality of training values corresponding to the histogram bin; and
calculating the confidence interval associated with the histogram bin from the subset mean and the subset standard deviation.

20. The system of claim 18, wherein the measurement controller is further configured to:
determine from a plurality of measured values a need to perform the training process; and
in response to the determination of the need, perform the training process.

\* \* \* \* \*